United States Patent
Thomassen

(10) Patent No.: US 6,946,627 B2
(45) Date of Patent: Sep. 20, 2005

(54) METHOD FOR MANUFACTURING AN ELECTRICAL CABLE SYSTEM COMPRISING AN ELECTRICAL CABLE CONTAINING A CONDUCTOR CORE AND FOR INSTALLING SAID ELECTRICAL CABLE SYSTEM OVER A LONGITUDINALLY EXPANDABLE-CONTRACTIBLE ELEMENT

(75) Inventor: Per Thomassen, Fredrikstrad (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/650,359

(22) Filed: Aug. 27, 2003

(65) Prior Publication Data

US 2004/0108125 A1 Jun. 10, 2004

(30) Foreign Application Priority Data

Sep. 2, 2002 (NO) .......................................... 20024168

(51) Int. Cl.⁷ ................................................ H05B 3/56
(52) U.S. Cl. ...................................... 219/535; 392/480
(58) Field of Search ................................. 219/535, 548, 219/549, 528, 529, 545, 211, 212; 392/479, 480, 481, 468, 469; 174/110 R, 36, 113 R, 113 C; 138/33

(56) References Cited

U.S. PATENT DOCUMENTS

| | | | | |
|---|---|---|---|---|
| 3,729,613 | A | * | 4/1973 | Deloire et al. ............... 219/211 |
| 4,427,033 | A | | 1/1984 | Ege ............................. 138/103 |
| 6,102,077 | A | * | 8/2000 | Legallais et al. ........... 138/115 |
| 6,239,363 | B1 | * | 5/2001 | Wooters ..................... 138/113 |
| 6,239,374 | B1 | * | 5/2001 | Kastner .................. 174/113 R |
| 6,323,420 | B1 | * | 11/2001 | Head ....................... 174/102 R |
| 6,713,724 | B1 | * | 3/2004 | Carr et al. .................. 219/212 |
| 2002/0033554 | A1 | * | 3/2002 | Heagy et al. ............... 264/269 |

* cited by examiner

Primary Examiner—Teresa J. Walberg
(74) Attorney, Agent, or Firm—Sofer & Haroun, LLP

(57) ABSTRACT

An electrical cable system and a method for manufacturing an electrical cable system (1) has an electrical cable (10) containing a conductor core (2). The method for installing the electrical cable system of a longitudinally expandable contractible element (1',6) includes disposing a secondary element (3) over the electrical cable so as to give the electrical cable substantially attached undulations (100) forming an additional length. The electrical cable system is installed by clamping at least at two points to the longitudinally expandable-contractible elements. The secondary element is handled after the clamping so as to release the attachment of the undulations thereby converting the additional length into a free to be used excess length.

8 Claims, 4 Drawing Sheets

FIG_1
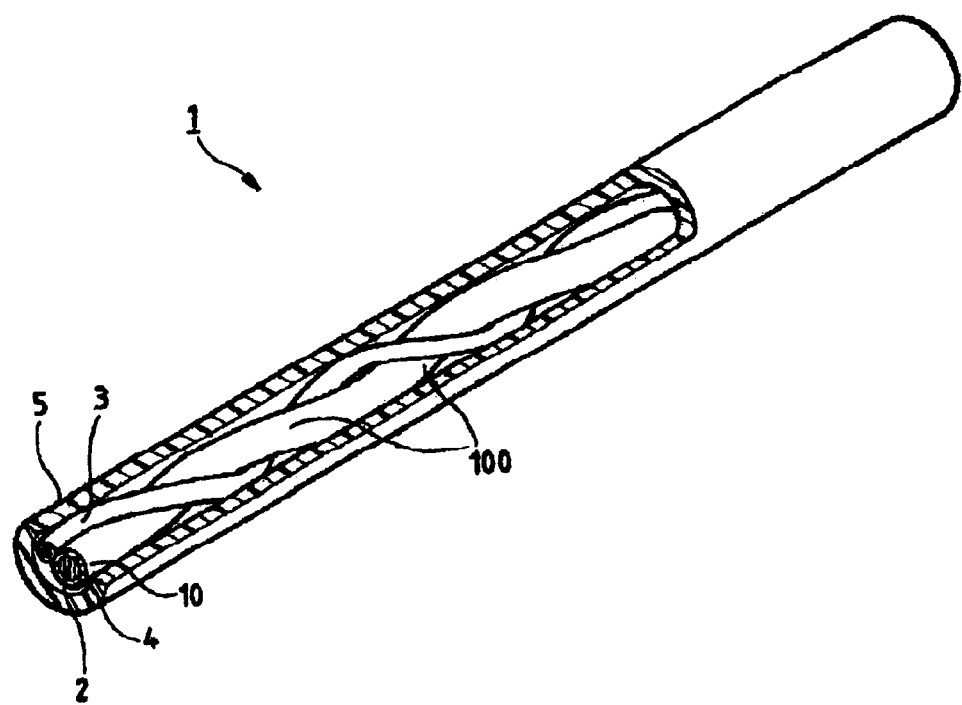

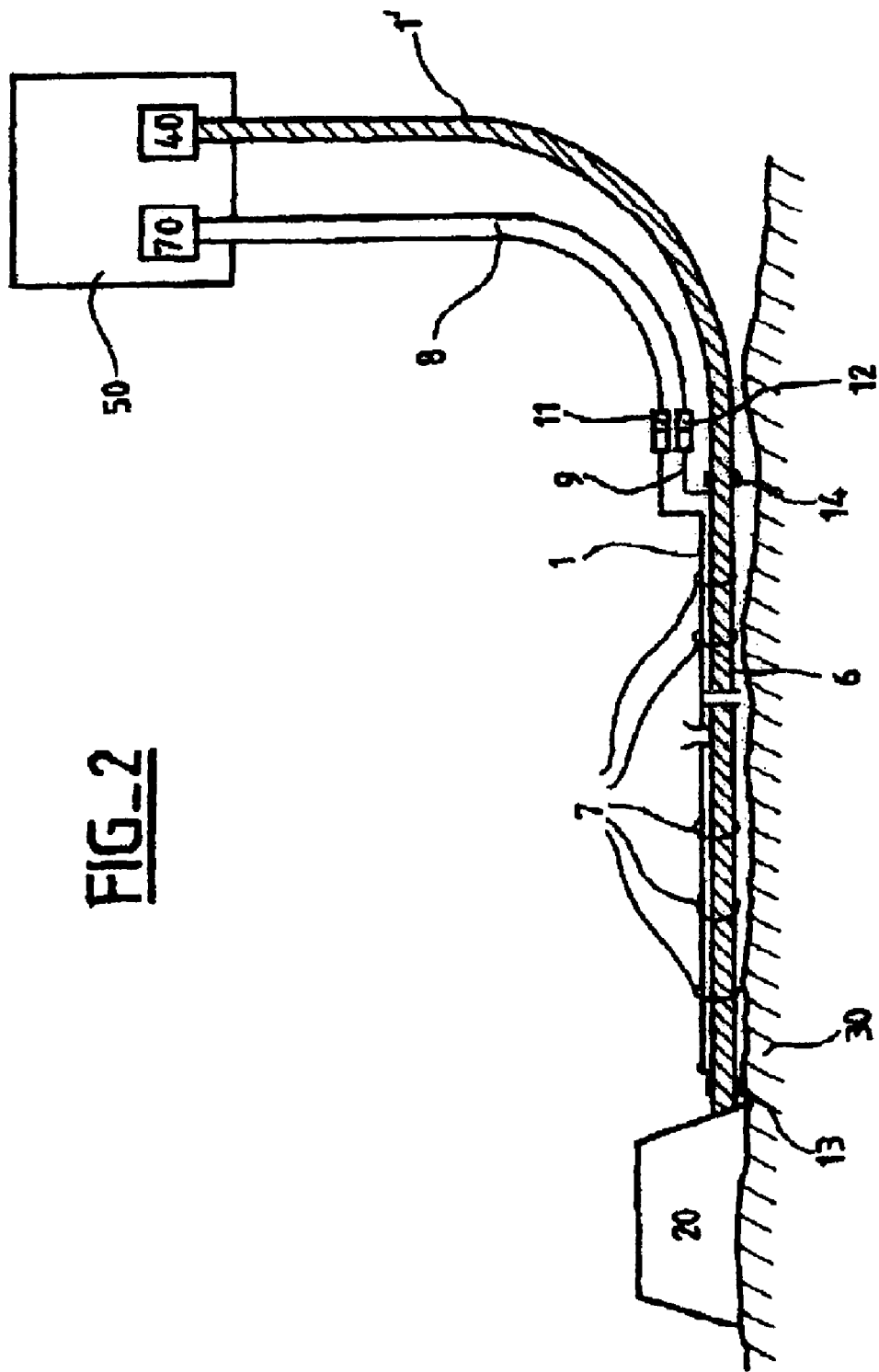
FIG_2

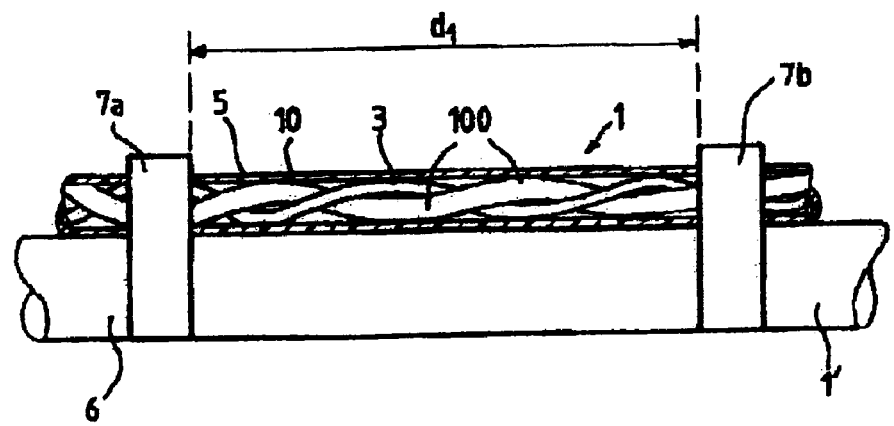
FIG_3a
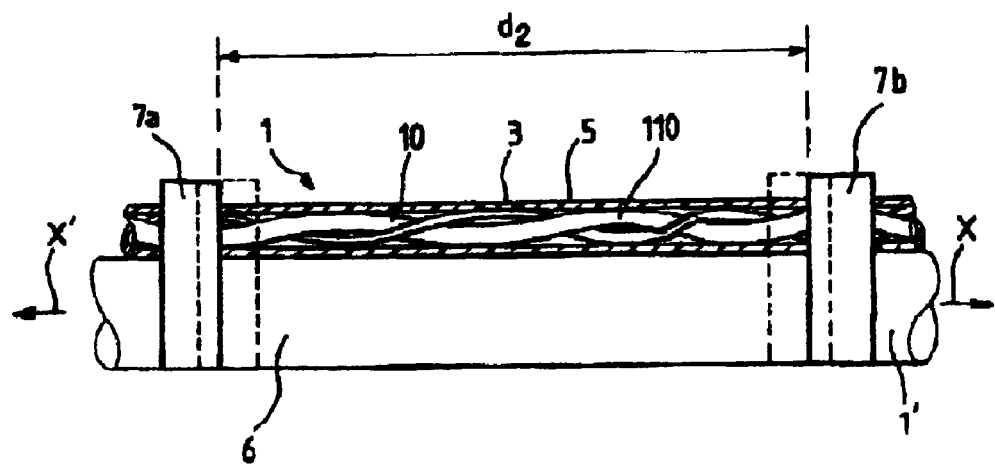
FIG_4a

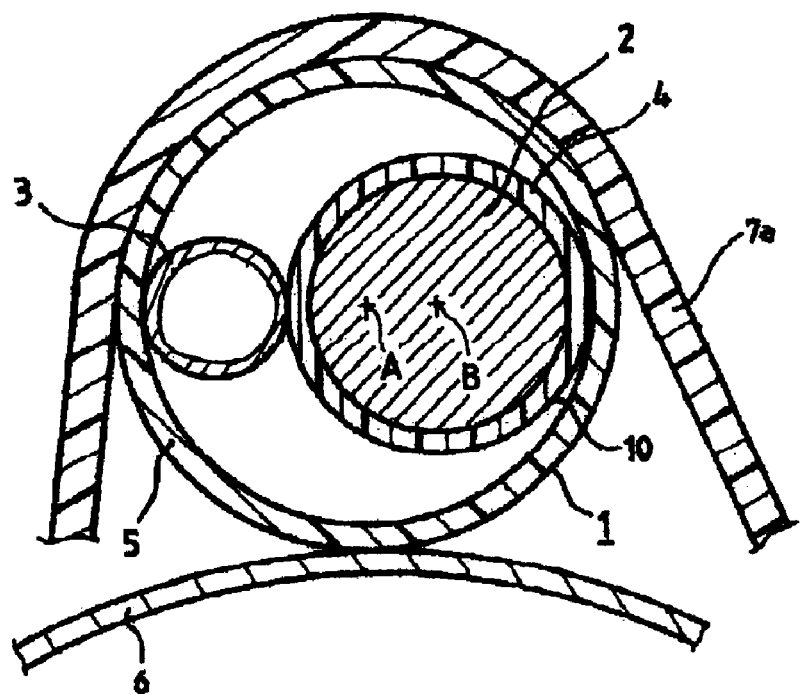
FIG_3b
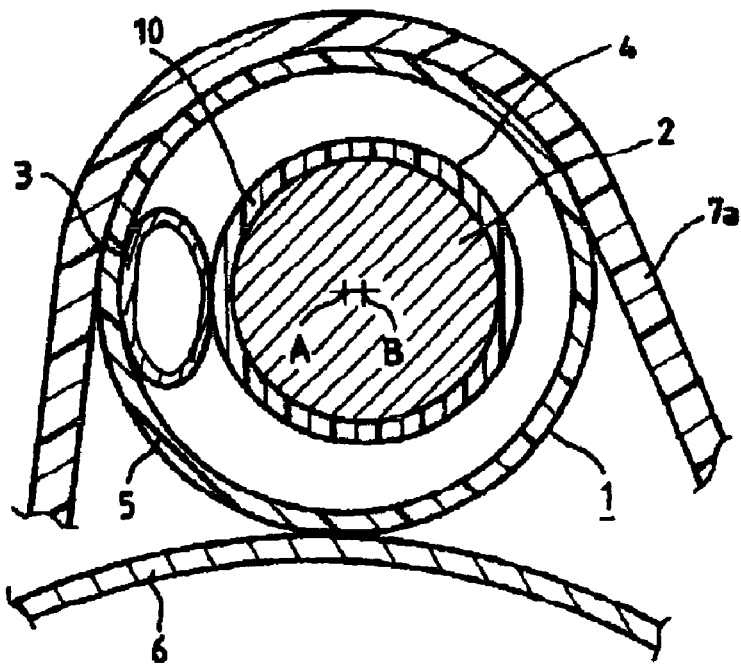
FIG_4b

METHOD FOR MANUFACTURING AN ELECTRICAL CABLE SYSTEM COMPRISING AN ELECTRICAL CABLE CONTAINING A CONDUCTOR CORE AND FOR INSTALLING SAID ELECTRICAL CABLE SYSTEM OVER A LONGITUDINALLY EXPANDABLE-CONTRACTIBLE ELEMENT

RELATED APPLICATION

This application is related to and claims the benefit of priority from Norwegian Patent Application No. 2002 4168, filed on Sep. 2, 2002, the entirety of which is incorporated herein by reference.

FIELD OF THE INVENTION

The present invention relates to a method for manufacturing an electrical cable system comprising an electrical cable containing a conductor core and for installing said electrical cable system over a longitudinally expandable-contractible element and also relates to such a manufactured electrical cable system.

BACKGROUND OF THE INVENTION

Subsea pipelines are conventionally used for transporting fluid such as gas or oil from a well to a platform/template or the like. When the transporting process is operative the pipeline wall is heated by the hot (150 to 200 degrees C.) flowing fluid. The pipeline wall will during this phase obtain its maximum elongation.

When the transport of fluid has to be stopped—for some reason or other—the fluid within the pipeline wall will gradually cool down to the temperature of the surrounding sea (some 4 degrees C.) resulting in clogging of the pipeline by hydrate formation of the fluid. During this phase, the pipeline will contract and experience its minimum elongation. Before reaching this phase it is well known to heat the pipeline sufficiently to prevent the mentioned clogging of the fluid within the non-operated pipeline using an electrical heating system.

To this purpose, the heating system comprises a subsea electrical cable clamped to the pipeline surface at more or less regular intervals, in parallel to the pipeline axis. During this installation, the subsea electrical cable is submitted to pulling forces—typically around 20 kN—so that it becomes a tensioned cable. Moreover, whereas the pipeline is quite capable of expanding and contracting—in the axial direction—as a result of temperature changes,—this is not so with the clamped subsea electrical cable. Forced into the same elongation during production, typical tension in the subsea electrical cable will be increased from 20 kN to 120 kN approximately. But such a high tension is unpredictable, and beyond what is acceptable for the cable itself and the cable clamps. The clamps will therefore break or move relatively to the subsea electrical cable and the pipeline and in worst case, damaging both.

OBJECT AND SUMMARY OF THE INVENTION

It is therefore an object of the invention to obviate these problems and develop an improved method allowing a subsea electrical cable of a heating system to withstand mechanical forces applied during installation by clamping to the pipeline as well as coping with later movement due to thermal cycles of the pipeline without damages.

More broadly, an object of the invention is to provide a method allowing an electrical cable to withstand tension during its manufacturing and during installation on to the outer surface of an longitudinally expandable-contractible element and further preventing the cable to set up high tension when the length of the expandable-contractible element fluctuates.

To this purpose, the invention provides a method for manufacturing an electrical cable system comprising an electrical cable containing a conductor core and for installing said electrical cable system over a longitudinally expandable-contractible element characterized in that it comprises the successive steps of:

disposing a secondary element over said electrical cable so as to give said electrical cable substantially attached undulations, thereby forming an additional length, installing by clamping at least at two points said electrical cable system to said longitudinally expandable-contractible element, handling said secondary element after said clamping so as to release the attachment of said undulations, thereby converting said additional length into an excess length that is free to be used.

In the whole description substantially attached undulations means undulations substantially constant in terms of amplitude, form or length. It is a way to prevent the electrical cable from stretching or elongating during manufacturing, transport and installation. In other words, during manufacturing and installation attached undulations form an additional length as compared to the length of a straight electrical cable.

While the electrical cable of the invention is able to withstand tension during manufacturing and installation, the tension from installation is removed after installation by handling said secondary element. Once said releasing is done, the additional length is converted into a "free to be used" excess length: the electrical cable is able to extend while keeping its wavy form instead of elongating as a straight electrical cable.

Therefore, the excess length is produced after clamping allowing said electrical cable to cope with the length fluctuations of said extractable-contractible element without increasing the tension unlike any electrical cable of the prior art.

Advantageously, the method according the invention can comprise the step of using a radially expandable hose as said secondary element and the disposing step can consist of stranding said radially expandable hose and said electrical cable together in a helical-like configuration.

Preferably, the method according the invention can comprise the step of radially expanding said hose by providing high internal pressure within said hose before said stranding process.

In addition, the method can comprise the step of maintaining said high internal pressure during the clamping process and said handling process can consist of reducing said internal pressure, said hose being radially non expanded.

Furthermore, the method can comprise the step of providing a common outer sheath surrounding said hose and said electrical cable.

Naturally, the present invention provides an electrical cable system comprising an electrical cable containing a conductor core and suitable for being installed by clamping over a longitudinally expandable-contractible element characterized in that it further comprises said secondary element which is disposed over said electrical cable in a way to give said electrical cable substantially attached undulations before and during said clamping, thereby forming an additional length, and in that said secondary element is handleable in order to release the attachment of said undulations after said clamping, thereby converting said additional length in a free to be used excess length.

In a preferred embodiment of the invention, said secondary element is a radially expandable hose with an adjustable internal pressure.

The internal pressure is high during said manufacturing and installation and has a lower internal pressure after handling.

The stranding process ensures the electrical cable as well as the secondary element wavy forms.

The expandable hose and the electrical cable can be stranded together in a helical-like configuration in order to obtain said attached undulations.

The electrical cable system can comprise a common outer sheath surrounding said secondary element and said electrical cable.

Preferably, said conductor core is a copper core and is covered with a polymer insulation sheath.

The invention also provides a heating system comprising an electrical cable system as described previously to be clamped at least at two points to a subsea pipeline.

The foregoing and other objects, features and advantages of the present invention will become more apparent in the following detailed description of the preferred embodiment as illustrated in the accompanying figures.

BRIEF DESCRIPTION OF THE DRAWINGS

FIG. 1 is a partial, perspective and longitudinal view of an electrical cable system according to a preferred embodiment of the invention, FIG. 2 shows a heating system with the electrical cable system of FIG. 1, FIG. 3a is a schematic drawing (not in scale) showing partially and in a longitudinal section the electrical cable system during clamping at two neighbor points to the subsea pipeline.

FIG. 3b discloses schematically (not in scale) a cross section of the electrical cable system of FIG. 3a.

FIG. 4a is a schematic drawing (not in scale) showing in a longitudinal section the electrical cable system during hot fluid transportation in the subsea pipeline.

FIG. 4b discloses schematically (not in scale) a cross section of the electrical cable system after clamping.

Elements having the same function are referenced with a same number in all the figures.

DETAILED DESCRIPTION

FIG. 1 discloses a partial, perspective and longitudinal view of an electrical cable system 1 according to a preferred embodiment of the invention.

The electrical cable system 1 comprises
- an electrical cable 10 containing a conductor core which is preferably a large copper core 2 (typically of 630 mm$^2$–1200 mm$^2$) and preferably covered by a polymer insulation sheath 4,
- a hose 3 with a high internal pressure provided by filling with compressed fluid (not shown) such as oil, water or the like,
- preferably a common outer sheath 5 (partly cut in FIG. 1) surrounding the stranded electrical cable 10 and the hose 3 and made of polyethylene or other material(s).

The hose 3 is a high pressure hydraulic hose preferably with a synthetic braiding (not shown). The inner liner is flexible and the braiding is not tight at one atmosphere.

When pressurized, the hose 3 is radially expanded, and the synthetic braiding tightened. The stranded electrical cable 10 is able to withstand high tension without stretching or elongating.

While manufacturing said electrical cable system 1, the hose 3 is pressurised, then said hose 3 and the electrical cable 10 are stranded together in a helical-like or spiral-like shape and the common outer sheath 5 is providing.

The purpose of this common outer sheath 5 is to protect the electrical cable 10 and the hose 3 during transportation, during installation of the electrical cable system 1 over a subsea pipeline.

The wavy form of the electrical cable 10, consists of undulations 100 attached by the stranded hose 3, creating an additional length as compared to the length of a straight electrical cable. The electrical cable 10 is substantially prevented from moving. The dimension of the additional length is set by the lay length and the relation between the diameters of the copper core 2 and the hose 3.

The polymer insulation sheath 4 preferably comprises an inner semi-conductor layer as inner screen, an insulation layer and an outer semi-conductor layer as outer screen, In FIG. 2, a heating system which comprises the electrical cable system 1 is schematically illustrated. An insulated metal tube (i. e. the pipeline) connects a template 20, such as a gas or oil well-head, on the seafloor 30 with a processing unit 40 installed on a platform 50. The tube 1' has an outer thermal insulation ensuring that fluid such as crude oil coming from the template has a sufficiently low viscosity until it reaches platform 50. If the oil flow is stopped, formation of hydrate plugs and wax deposits occur which can block the pipeline when oil transportation is to be resumed again.

To avoid this problem, the tube 1' can be heated. One or several sections 6 of the tube 1' are connected to a power supply unit 70 installed on the platform 50 with a riser cable 8 containing one or more conductor pairs with an insulated feeder and return conductor. The riser cable 8 is protected by an armoring and an outer sheathing.

At the lower end of the riser cable 8, connecting elements 11, 12 are proposed respectively to connect the electrical cable system 1 and a single conductor cable 9 to a return conductor and a feeder conductor in the riser cable 8. More over, the electrical cable system 1 and the single conductor cable 9 are connected with the section 6 of tube 1'. Insulating flanges 13, 14 insulate the section(s) 6 of a pipeline from each other.

During installation, the electrical cable system 1 is clamped parallel to the pipeline axis and at more or less regular intervals in the heated section 6 by a series of clamps 7 and preferably straps.

The power supply unit 70 generates an electrical AC current, preferably in the range of 500 to 2000 A, and a voltage which is preferably in the range of 5 to 40 KV. The current is fed via riser cable 8, the electrical cable of the electrical cable system 1 and the conductor cable 9 through a section 6 of the tube 1. The AC current causes a heating of the tube 1' in section 6 and ensures a sufficiently low viscosity of the material inside.

FIG. 3a is a schematic drawing (not in scale) showing partially and in a longitudinal section the electrical cable system 1 during clamping to the subsea pipeline in section 6.

Of course, the electrical cable system 1 extends to both sides from straps 7a and 7b. The distance between the two straps is by way of example some six to ten meters.

The hose 3 and the electrical cable 10 are stranded together in a helical like configuration.

$d_1$ is the distance between the two straps 7a and 7b. The attached undulations 100 of the electrical cable 10 within the common sheath 5 created by the helical like configuration, obviously provide the electric cable 10 additional actual length relative to the actual spanned longitudinal distance $d_1$. The section 6 of the pipeline 1' is cold and has its minimal elongation.

FIG. 3b discloses schematically (not in scale) a cross section of the electrical cable system 1 of FIG. 3a.

The pressurised hose 3 has a circular-like cross section. The center B of the electrical cable 10 with the copper core 2 and the polymer insulation sheath 4 is shifted from the center A defined by the common protective sheath S.

After the clamping, the internal pressure of the hose 3 is removed (step not shown) giving the hose a cross section as illustrated in FIG. 4b. The hose 3 now is flexible both in radial and longitudinal direction Consequently, the built-in additional length is therefore converted in a "free to be used" excess length since the undulations of the electrical cable 10 are no more attached and the electrical cable may act as a centre element.

FIG. 4a is a schematic drawing (not in scale) showing in a longitudinal section the electrical cable system 1 during hot fluid transportation in the subsea pipeline 1'.

The depressurised hose 3 is just laid around the electrical cable 10.

The straps 7a, 7b followed the expansion of the pipeline 1' (symbolized by the arrows X–X') as shown by the dotted lines indicating the position of said straps before the flowing of hot fluid. The distance $d_2$ separating said straps has increased. The electrical cable 10 by using a part of the defined excess length has attenuated undulations 110 within the common outer sheath 5. If required, the electrical cable 10 may become a straight electrical cable at the maximal temperature of the subsea pipeline. The excess length is adjusted to extension-contraction of the pipeline 1' caused by the temperature variations.

Preferably, the outer sheath 5 is easily expandable at low level of tension thanks to a good elasticity and a relatively low module.

FIG. 4b discloses schematically (not in scale) a cross section of the electrical cable system 1 when the internal pressure in the hose is released,—regardless of whether the pipeline is hot or not.

The center B of the electrical cable 10 is nearer to the center A of the outer protective sheath 5. The depressurised hose 3 has a oval—like cross section.

According to the invention, the electrical cable 10 is able to withstand pulling forces of 20–30 kN before and during clamping. After depressurisation, the tension from installation is removed. The electrical cable 10 extends instead of physically elongating, without transferring too much force, to the straps 7a and 7b, estimated around 3 kN. Therefore, during length fluctuations of the pipeline 1', the 7a and 7b straps will not suffer excessive tension and the electrical cable 10 is not damaged.

What is claimed is:

1. Method for manufacturing an electrical cable system having an electrical cable containing a conductor core, and for installing said electrical cable system over a longitudinally expandable-contractible element, said method comprising the steps of:
    disposing a secondary element over said electrical cable, said secondary element being a radially expandable hose, so as to give said electrical cable substantially attached undulations thereby forming an additional length, said additional length formed by stranding said radially expandable hose around said electrical cable in a helical formation, where said electrical cable and said radially expandable hose are both twisted relative to one another;
    installing, by clamping at least at two points, said electrical cable system to said longitudinally expandable-contractible element; and
    handling said secondary element after said clamping so as to release the attachment of said undulations, thereby converting said additional length into a free to be used excess length.

2. Method according to claim 1 further comprising the step of radially expanding said hose by providing high internal pressure within said hose before said stranding process, in that the method includes the step of maintaining said high internal pressure during the clamping process, and in that said handling process consists of reducing said internal pressure, causing said hose to be radially non expanded.

3. Method according to claim 1 further comprising the step of providing a common outer sheath surrounding said radially expandable hose and said electrical cable.

4. An electrical cable system having an electrical cable containing a conductor core and suitable for being installed by clamping over a longitudinally expandable-contractible element comprising:
    a secondary element, said secondary element being a radially expandable hose, which is disposed over said electrical cable in a way to give said electrical cable substantially attached undulations before and during said clamping, thereby forming an additional length, said additional length formed by stranding said radially expandable hose around said electrical cable in a helical formation, where said electrical cable and said radially expandable hose are both twisted relative to one another; and wherein said secondary element is handleable in order to release the attachment of said undulations after said clamping, thereby converting said additional length in a free to be used excess length.

5. Electrical cable system according to claim 4 wherein said radially expandable hose has an adjustable internal pressure.

6. Electrical cable system according to claim 4 further comprising a common outer sheath surrounding said secondary element and said electrical cable.

7. Electrical cable system according to claim 4 wherein said conductor core is a copper core and is covered with a polymer insulation sheath.

8. Heating system comprising an electrical cable system according to claim 4, to be clamped at least at two points to a subsea pipeline.

* * * * *